June 22, 1965 R. E. HAWKINS 3,190,330
GARNISH CUTTER FOR FRUIT AND VEGETABLES
Filed May 20, 1963 2 Sheets-Sheet 1

INVENTOR.
Robert E. Hawkins
BY
Hovey, Schmidt, Johnson & Hovey
ATTORNEYS.

June 22, 1965 R. E. HAWKINS 3,190,330
GARNISH CUTTER FOR FRUIT AND VEGETABLES
Filed May 20, 1963 2 Sheets-Sheet 2
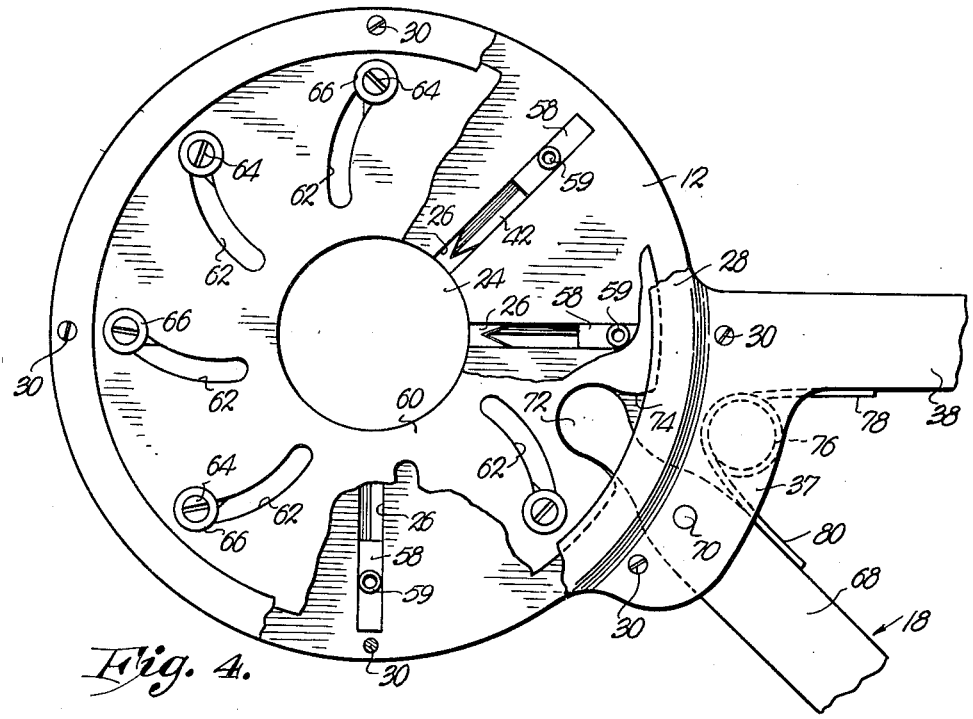
INVENTOR.
Robert E. Hawkins
BY
Hovey, Schmidt, Johnson & Hovey
ATTORNEYS

United States Patent Office 3,190,330
Patented June 22, 1965

3,190,330
GARNISH CUTTER FOR FRUIT AND VEGETABLES
Robert E. Hawkins, Kansas City, Mo., assignor to
Michael L. Antos, Kansas City, Mo.
Filed May 20, 1963, Ser. No. 281,704
5 Claims. (Cl. 146—203)

This invention relates to an improved device for garnishing edible products and especially to a hand-operated cutter designed to form a crown cut in fruit or vegetables to enhance their appearance in decorating plates of food or the like.

It is the primary object of the present invention to provide apparatus for garnishing food and vegetables which is constructed in a manner so as to be manually operable and to be held in one hand as the product to be garnished is held in the other hand to thereby obviate having to place the product on a table or a support prior to garnishing the product with a knife or other similar device as was heretofore required.

Another object of the present invention is the provision of apparatus of the aforesaid character which is provided with manually actuated cutters which are adapted to sever an edible, severable consumer product disposed between the cutters into two pieces while simultaneously garnishing both pieces to thereby reduce the time and effort required to garnish the product.

A further object of the present invention is the provision of apparatus of the type described which is provided with the manually actuated cutters in normally spaced-apart relationship and movable toward each other whereby a severable consumer product disposed between the cutters and across the paths of travel thereof may be severed and thereby garnished as the cutters move toward each other.

Still another object of the present invention is the provision of handle means on the apparatus of the type described which, when shifted by the application of a squeezing action on the part of the user of the apparatus, effects the shifting of the cutters toward each other so that the product between the cutters will be severed and thereby garnished.

A further object of the present invention is the provision of handle means of the type described which is provided with spring bias means for normally biasing the cutters into their spaced-apart positions so that, following the severing and thereby the garnishing of one product, the cutters will spring apart and be in condition for receiving another product therebetween to be garnished.

Another object of the present invention is the provision of a garnishing device which is capable of garnishing a number of different kinds of edible, severable consumer products and which may be readily cleaned after the garnishing operation, as well as being simple to operate and being economically constructed from generally commercially available materials, all to the end that the apparatus may be employed by an individual without any special skill on the part of the latter.

In the drawings:

FIG. 4 is a view similar to FIG. 2 but showing the opposite side of the apparatus, parts being broken away to illustrate details of construction;

FIG. 5 is a view similar to FIG. 4 but showing the cutters in their closed or product-garnishing positions;

FIG. 6 is a cross-sectional view taken along line 6—6 of FIG. 3; and

FIG. 7 is a perspective view of an edible, severable consumer product garnished by the apparatus made pursuant to the preferred concepts of the present invention.

Figure 1:
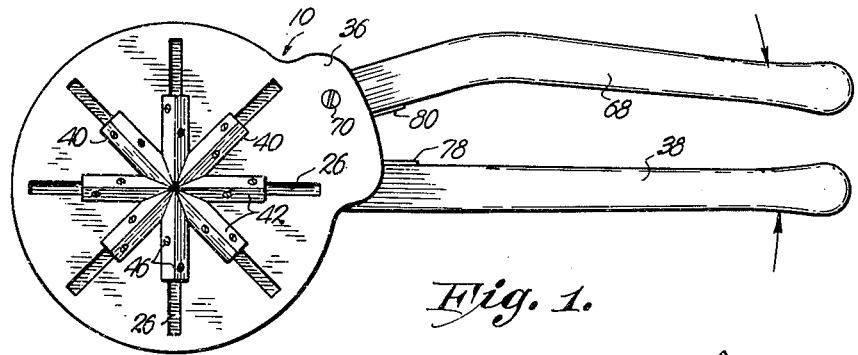
FIGURE 1 is a side elevational view of the garnishing device made pursuant to the present invention and showing the cutter means thereon in the closed or product-garnishing positions thereof.

The present invention includes a device for garnishing edible, severable consumer products and includes a support provided with means thereon for mounting a number of cutters thereon for movement of the cutters toward and away from each other so that a product to be garnished will be severed and thereby garnished when the product is disposed between the cutters and in the paths of travel of the latter.

Cam structure in the nature of a plate provided with a series of circumferentially extending slots is rotatably mounted on the support and coupled with the cutters for advancing the same toward each other as the plate is rotated in one direction and for moving the cutters away from each other when the plate is rotated in the opposite direction.

Handle structure is provided on the support and coupled with the plate so that, as the handle structure is squeezed by manual pressure, the cutters move toward each other to thereby garnish the product between the cutters. A spring biases the handle structure in a direction to force the cutters away from each other so that a product to be subsequently garnished may be disposed between and in the path of the cutters.

The apparatus forming the subject of the present invention is broadly denoted by the numeral 10 and includes a support 12, cutter means 14 shiftably mounted on support 12, cam structure 16 carried by support 12 for shifting cutter means 14, and handle means 18 coupled with cam structure 16 for rotating the latter relative to support 12 to thereby shift cutter means 14 in opposed directions.

Support 12 is plate-like in configuration and has a pair of opposed faces 20 and 22. Although support 12 as shown in the drawings is circular in configuration, it is clear that the same could have a polygonal periphery. Support 12 is provided with a central opening 24 and a number of elongated openings 26 extending radially outwardly from central opening 24, there being an opening 26 aligned with a corresponding opening 26 in diametrically opposed relationship to central opening 24.

A plate-like member 28 is coupled with support 12 at face 22 thereof by fasteners 30. Member 28 is provided with a substantially annular shoulder 32 to form with support 12 an annular groove denoted by the numeral 34. Fasteners 30 are preferably of the type which render member 28 releasably coupled with support 12 so that apparatus 10 may be completely disassembled for cleaning purposes or the like.

Support 12 is provided with a boss 36 integral therewith and extending outwardly from one portion of the periphery thereof. Member 28 is provided with a boss 37 which is substantially identical to the configuration of boss 36, bosses 36 and 37 being generally spaced apart when member 28 is coupled with support 12. An extension 38 forming a part of handle means 18, projects outwardly from and is integral with boss 37, the inner end of extension 38 spanning the distance between bosses 36 and 37.

Cutter means 14 includes a cutter 40 for each opening 26, each cutter 40 including a blade 42 and a follower 44 coupled to blade 42 by screws 46 and shiftably disposed within the corresponding opening 26. Each blade 42 is edges 48 terminating in a point 50 which is coincident with the line of bend 52 at which the sides 54 of blade 42 terminate. In normal usage, each cutter 40 is disposed with line 52 spaced outwardly from face 20 of support 12 and with point 50 thereof directed inwardly toward central opening 24. This is best illustrated in FIG. 3 wherein the points 50 of cutters 40 are directed toward the central axis of opening 24.

Each follower 44 includes a triangular portion 56 and a shank portion 58 as is clear in FIG. 6. Portion 56 is disposed for sliding movement over face 20 of support 12, while shank portion 58 is disposed for movement through the corresponding opening 26. Shank portion 58 has a reduced portion 59 and extends outwardly from face 22 of support 12 for a purpose hereinafter made clear. Blade 42 corresponding to each follower 44 is complementally received on the corresponding portion 56 as is clear in FIG. 6. Screws 46 are threadably coupled with portion 56, the latter being of a material suitable to be internally threaded.

Cam structure 16 includes an annular plate 60 having a number of circumferentially spaced, arcuate slots 62 therein, each defining a pair of opposed cam surfaces, there being a slot 62 corresponding to each of the openings 26 respectively.

Figure 3:
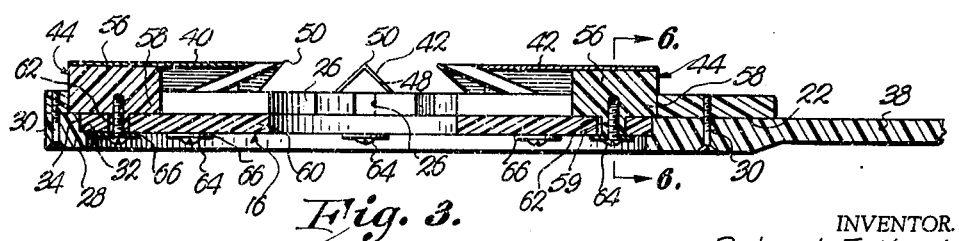
FIG. 3 is a cross-sectional view taken along line 3—3 of FIG. 2.

Plate 60 is disposed with the outer periphery thereof within groove 34 as is clear in FIG. 3, so that plate 60 is rotatable about the central axis of central opening 24. The inner periphery of plate 60 is substantially of the same diameter as opening 24 and slots 62 of plate 60 are disposed intermediate the inner and outer peripheries thereof.

Each slot 62 is disposed with at least a portion thereof in alignment with the corresponding opening 26 for all positions of plate 60 as the latter rotates through a predetermined arc relative to support 12. As shown in FIG. 6, shank portion 58 of each follower 44 extends into the portion of the corresponding slot 62 aligned with the corresponding opening 26.

A machine screw 64 is threaded into shank portion 58 and, together with a washer-like element 66, maintains follower 44 coupled with plate 60. Shank portion 58 of each follower 44 thus engages the surfaces of plate 60 defining the corresponding slot 62 so that the follower 44 is shifted longitudinally of the corresponding opening 26 as plate 60 rotates realtive to support 12 in groove 34. The arc through which plate 60 is capable of rotating is determined by the lengths of slots 62 or the lengths of openings 26. In this respect, it is clear that the arc through which plate 60 is capable of rotating could well be determined by the initial spaced-apart positions of cutters 40 since, when the latter are moved toward each other into the positions shown in FIGS. 1 and 5, the cutters 40 are unable to move any farther inwardly. In the positions of FIGS. 1 and 5, points 50 of blades 42 all terminate at a common point, namely, a point on the axis of opening 24. In addition, edges 48 will be in substantial juxtaposition since the same are of the same length.

Handle means 18 further include a handle 68 pivotally coupled with and disposed between bosses 36 and 37 by means of a pin 70 passing through handle 68 intermediate the ends thereof, pin 70 being in spaced relationship to the inner end of extension. One end 72 of handle 68 is rounded and is receivable within a slot 74 in the periphery of plate 60, end 72 being complementally received within the major portion of slot 74. The outermost extremity of slot 74 is flared outwardly and the portion of handle 68 between end 72 and pin 70 is reduced in width so that end 72 will be substantially pivotally received within slot 74 so as to shift plate 60 about the axis of opening 24 as handle 68 is shifted toward and away from extension 38.

Figure 2:
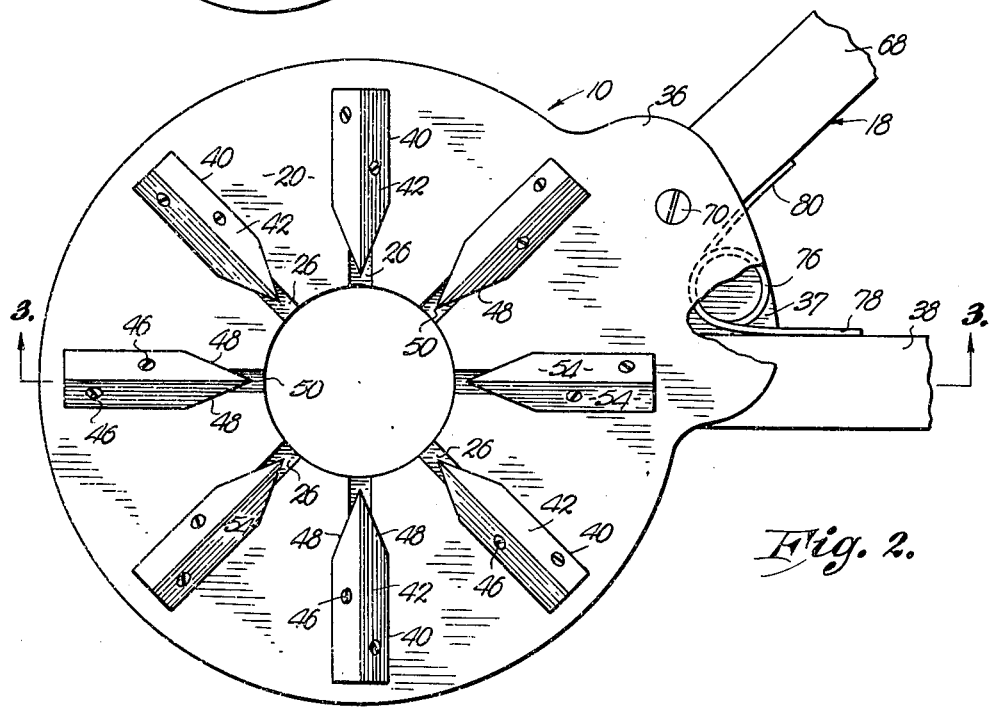
FIG. 2 is an enlarged, fragmentary, side elevational view of the apparatus and illustrating the cutters in their normally open positions ready to receive a product therebetween to be garnished.

A coil spring 76 having a pair of ends 78 and 80 is carried between bosses 36 and 37 in a position so that ends 78 and 80 engage proximal surfaces of extension 38 and handle 68 respectively, as is clear in FIGS. 2, 4 and 5. Spring 76 biases handle 68 in a counterclockwise direction when viewing FIG. 2 so that plate 60 is biased in a direction to shift cutters 40 outwardly of opening 24.

In operation, handle 68 is biased away from extension 38 by spring 76 so that a product to be garnished may be disposed within opening 24 and the adjacent opening of plate 60. The user of apparatus 10 grasps extension 38 and handle 68 in one hand so as to apply a squeezing action thereto to move handle 68 toward extension 38. The user holds the product to be garnished in the other hand, while at the same time positioning the product within opening 24 and thereby within the path of travel of cutters 40. Plate 60 is configured so that cutters 40 are in their outermost positions, as shown in FIG. 2, when handle 68 is spaced the maximum distance away from extension 38.

To sever and thereby garnish the product within opening 24, the user forces handle 68 toward extension 38 by a squeezing action so as to in turn rotate plate 60 about the axis of central opening 24 and at the same time, to urge cutters 40 inwardly toward each other and toward the axis of opening 24. Cutters 40 therefore, move until blades 42 are in the positions thereof illustrated in FIGS. 1 and 5.

Points 50 of blades 42 pierce the product and further inward travel of cutters 40 causes edges 48 to sever the product along predetermined lines. When points 50 arrive at their common terminus at the axis of central opening 24, the product will be effectively severed into two pieces and the pieces will be garnished since the edges 48 will have formed a predetermined pattern in the severed surface of the product.

In FIG. 7, a product 82 garnished by apparatus 10 is illustrated, product 82 having a substantially star-shaped configuration defined by a number of circumferentially spaced, scallop-like projections 84, each having a pair of converging triangular facets 86 extending outwardly to the periphery of product 82 and extending into the latter along lines forming the longitudinal edges of the facets of adjacent projections 84.

It is clear that the piece from which product 82 of FIG. 7 was cut is also of the same star-like configuration so that apparatus 10 is capable of severing and thereby garnishing two pieces of an edible, severable consumer product at the same time by a single cutting action of cutters 40. After the product has been severed, the pressure of the hand holding handle means 18 is relaxed so that spring 76 is capable of biasing handle 68 away from extension 38. Cutters 40 then move to their spaced-apart positions illustrated in FIG. 2, and apparatus 10 is, therefore, ready to receive another product in opening 24. The product previously severed by apppparatus 10 is, of course, caused to drop onto a supporting surface or into a receptacle or the like.

Apparatus 10 is readily cleaned by placing the same under a stream of water so that any particles of the product lodged between the cutters or between support 12 and plate 20 may be washed away from apparatus 10.

Depending upon the size of opening 24 and the distance apart by which cutters 40 are disposed, apparatus 10 is capable of severing, and thereby garnishing a number of different kinds of consumer products so that the present invention is suitable for home use, as well as use in restaurants or the like where a large variety of foods is served. Apparatus 10 may be operated by any individual without any substantial skills on the part of the latter, and apparatus 10 is capable of severing and thereby garnishing a relatively large number of particles in a short span of time.

For over-all cleaning purposes, the various parts forming apparatus 10 may be completely disassembled from each other and replaced without the expenditure of a large amount of time and effort.

Having thus described the invention, what is claimed as new and desired to be scured by Letters Patent is:

1. Apparatus for garnishing an edible, severable consumer product, said apparatus comprising:

a support having a pair of opposed surfaces, a central opening and a number of circumferentially spaced openings extending substantially radially outwardly from said central opening;

an annular plate having an inner periphery of a diameter substantially equal to the distance across said central opening of the support;

means coupled with said support adjacent one of the surfaces thereof and defining therewith an arcuate groove in surrounding relationship to said central opening and the radial openings, said plate being shiftably disposed within said groove for rotation about an axis through said central opening, said plate being provided with a number of arcuate slots therein, each having a portion thereof aligned with a corresponding radial opening when said plate is rotated relative to the support in opposed directions through a predetermined arc;

a follower shiftably disposed within each radial opening respectively and extending into the corresponding slot;

means coupled with each of said followers and said plate for maintaining said follower in the corresponding slot to thereby effect the shifting of the follower in the corresponding radial opening toward and away from said central opening as said plate is rotated in said opposed directions;

a blade carried by each follower respectively for movement therewith, each blade having a pair of angularly disposed portions thereon for garnishing a product engaged thereby, said followers being simultaneously movable radially inwardly as said plate is rotated in one direction to shift said blades toward the center of said central opening and into locations with adjacent blades being in juxtaposition to each other, whereby the blades move along paths of travel of sufficient length to effect the severing and thereby the garnishing of a product disposed adjacent said central opening and across the paths of travel of said blades;

an extension rigid to and extending outwardly from said support; and a handle swingably mounted on said support adjacent said extension for movement toward and away from the latter, said handle being pivotally coupled with said plate for rotating the same in a direction to move said followers and thereby said blades toward said central opening as said handle is swung toward said extension.

2. Apparatus as set forth in claim 1, and including a spring between said extension and said handle for biasing the latter away from said extension.

3. Apparatus for garnishing an edible, severable consumer product comprising:

a support having an inner periphery defining a product-receiving space and provided with a plurality of elongated, circumferentially spaced openings therein extending radially with respect to said space;

a blade for each opening respectively, each blade having a pair of interconnected, angularly disposed portions, the outer extremities of said portions defining a pair of outer, product-severing edges for the corresponding blade;

means extending into each opening respectively and coupled with a corresponding blade for mounting the latter for radial movement in opposed directions toward and away from said space, said blades being movable inwardly of said periphery and into product-severing and garnishing positions at which said outer edges of each blade are disposed in juxtaposition with proximal edges of adjacent blades, whereby a product in said space will be severed and garnished by said edges as said blades move toward and into said positions;

cam structure reciprocably mounted on said support and coupled with said blades for moving the latter in said opposed directions as said cam structure is reciprocated; and means coupled with said cam structure for reciprocating the latter.

4. Apparatus as set forth in claim 3, wherein each portion is provided with a first edge segment extending longitudinally of the corresponding opening and a second edge segment angularly disposed relative to said first segment and extending radially inwardly away from the latter toward the adjacent portion, the second edge segments of said portions of each blade being relatively convergent to a location aligned with the junction between said portions to define a point adapted for piercing a product as the blade moves toward said position thereof.

5. Apparatus as set forth in claim 4, wherein said first and second edge segments of each blade are disposed in juxtaposition with proximal first and second edge segments of adjacent blades when said blades are in said positions.

References Cited by the Examiner

UNITED STATES PATENTS

| | | | |
|---|---|---|---|
| 1,087,805 | 2/14 | Meyer | 146—2 |
| 1,168,838 | 1/16 | Weber | 146—72 |
| 2,317,540 | 4/43 | Lanham | 30—114 |
| 2,569,566 | 10/51 | Hoffman | 82—64 |
| 3,103,676 | 9/63 | Kehaly | 10—89 |

J. SPENCER OVERHOLSER, *Primary Examiner.*